United States Patent
Jayabalan et al.

(10) Patent No.: US 11,768,671 B2
(45) Date of Patent: Sep. 26, 2023

(54) DYNAMIC MESSAGE EMBEDDED WITHIN APPLICATION NEW FEATURE ROLLOUT

(71) Applicant: International Business Machines Corporation, Armonk, NY (US)

(72) Inventors: Jayakarthik Jayabalan, West Mambalam (IN); Josephine E. Justin, Doddabanaswadi (IN); Kuntal Dey, Vasant Kunj (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/578,931

(22) Filed: Sep. 23, 2019

(65) Prior Publication Data

US 2020/0409682 A1 Dec. 31, 2020

Related U.S. Application Data

(63) Continuation of application No. 16/454,326, filed on Jun. 27, 2019, now Pat. No. 11,226,803.

(51) Int. Cl.
*G06F 9/445* (2018.01)
*G06F 8/65* (2018.01)

(52) U.S. Cl.
CPC ..................... *G06F 8/65* (2013.01)

(58) Field of Classification Search
CPC ........................................................ G06F 8/65
USPC ................................................ 717/168–178
See application file for complete search history.

(56) References Cited

U.S. PATENT DOCUMENTS

| | | |
|---|---|---|
| 6,334,109 B1 | 12/2001 | Kanevsky |
| 8,073,460 B1 | 12/2011 | Scofield |
| 8,099,316 B2 | 1/2012 | Moukas |
| 8,261,231 B1 | 9/2012 | Hirsch |

(Continued)

OTHER PUBLICATIONS

Chen, et al., "Personalized mobile advertising: Its key attributes, trends, and social impact", Technological Forecasting and Social Change, vol. 79, Issue 3, Mar. 2012, pp. 543-557, ScienceDirect, <https://www.sciencedirect.com/science/article/pii/S0040162511001788>.

(Continued)

*Primary Examiner* — Chuck O Kendall
(74) *Attorney, Agent, or Firm* — Aaron N. Pontikos (57) ABSTRACT

One or more processors compile user preference and activity information associated with a mobile device operated by the user. The installation of a first application (app) on the mobile device operated by the user is confirmed. Responsive to detecting availability of an update to the first application, and confirmation accepting installation of the update, dynamically embedding a message within a new feature included in the update of the first application. A message is selected from one or more available messages to dynamically embed within the new feature included in the update of the first application, based on profile and activity information collected about the first user, and responsive to receiving a confirmation to receive the update of the first application, the message selected from the one or more available messages, is presented to the user, embedded within the new feature of the update to the first application.

10 Claims, 4 Drawing Sheets

(56) References Cited

U.S. PATENT DOCUMENTS

| | | | |
|---|---|---|---|
| 8,997,081 B1* | 3/2015 | Manion | G06F 8/41 |
| | | | 717/168 |
| 9,282,446 B2 | 3/2016 | Moshfeghi | |
| 9,319,993 B1* | 4/2016 | Urbanus | H04W 52/0258 |
| 9,495,686 B1 | 11/2016 | Stekkelpak | |
| 9,946,531 B1 | 4/2018 | Fields | |
| 2002/0090934 A1 | 7/2002 | Mitchelmore | |
| 2006/0200658 A1* | 9/2006 | Penkethman | H04M 1/72406 |
| | | | 713/2 |
| 2009/0029721 A1 | 1/2009 | Doraswamy | |
| 2009/0156190 A1 | 6/2009 | Fisher | |
| 2009/0187463 A1 | 7/2009 | Dacosta | |
| 2014/0019228 A1 | 1/2014 | Aggarwal | |
| 2014/0325391 A1* | 10/2014 | Zhang | H04L 51/04 |
| | | | 715/753 |
| 2019/0129706 A1* | 5/2019 | Vangeel | G06F 9/4411 |
| 2019/0171438 A1* | 6/2019 | Franchitti | G06N 20/00 |
| 2020/0150949 A1* | 5/2020 | Jewkes | G06F 8/77 |

OTHER PUBLICATIONS

U.S. Appl. No. 16/454,326, filed Jun. 27, 2019.
List of IBM Patents and Patent Applications Treated as Related (Appendix P), filed herewith.

* cited by examiner

DYNAMIC MESSAGE EMBEDDED WITHIN APPLICATION NEW FEATURE ROLLOUT

FIELD OF THE INVENTION

The present invention relates generally to the field of information distribution, and more particularly to message delivery based on user mobile device activity coupled with introduction of an application upgrade.

BACKGROUND OF THE INVENTION

Mobile smart device applications (apps) that have received user permissions often collect and analyze user activity associated with the mobile device. Collection of mobile smart device information, such as a smart phone or tablet of a user, may include activities such as location, purchases, Internet browsing, content viewing, and communication topics. The collected information is often used to establish a user profile and determine interests and behaviors that an application uses to more closely match subject matter to the particular user.

Apps provide a variety of function and capability to users and are conveniently available to download and install on mobile smart devices. Once installed, features included but not enabled, or newly developed features, can be activated and added into the normal operation of the app.

SUMMARY

Embodiments of the present invention disclose a method in which the method provides for a computer-implementation in which one or more processors dynamically embeds a message within an update of a mobile application update. The method provides for one or more processors to collect preference information and activity information associated with a mobile device operated by a user. Responsive to detecting an update to a first application is available, the one or more processors determine whether installation of the update of the first application is accepted. Responsive to determining the installation of the update of the first application is accepted, the one or more processors selecting a message from one or more available messages based on the preference information and the activity information associated with the mobile device operated by the user. The one or more processors embed the message within the update of the first application, and responsive to the user of the mobile device accessing the update of the first application installed on the mobile device, the one or more processors presenting the message embedded within the update to the user.

DETAILED DESCRIPTION

Embodiments of the present invention recognize that information gathered from a mobile smart device of a user associated with location, travel patterns, purchase behavior, browsing behavior, home activities, external activities, contact interactions, communications, calendar events, and work schedule, can be analyzed to generate an information profile of a user of the smart device. The user profile information can be applied to direct a message that may be of particular interest to the user, based on the collected information.

Embodiments of the present invention collect user information associated with a mobile smart device operated by the user, and analyze the collected information determining user preferences, behavior patterns, and interests. Embodiments include the user participating in actively reviewing and granting permission for the operation of processes operating in embodiments of the present invention and collecting mobile device user information. Embodiments also include the user selecting or defining the types of data collected and not collected, as well as actively designating limitations for the use of the collected data. Embodiments provide the user access to view the collected and summarized data and allow the user to delete the collected and summarized data. Embodiments of the present invention enable the user to discontinue collection of mobile smart device information at any time.

Some embodiments of the present invention select a message particularly suited to the user, based on the user profile information, and embed the message within a feature update of an application (app) downloaded to the mobile smart device operated by the user. In some embodiments, both the message embedded within the update of the app and the format of delivery of the message, also referred to as the modality of the message, are based on the type of feature included in the update.

In response to a user's confirmation to receive and access the updated feature of the app, embodiments of the present invention present the message embedded within the updated feature of the app. In some embodiments of the present invention, the message is embedded within the updated feature of the app by including the message within the body of the visual display of the feature or instructions for the use of the feature. In some embodiments, the message is embedded within a background graphic associated with the new feature presentation. In yet other embodiments, the message is presented as an embedded graphic and text overlay of the new feature display. In still other embodiments, the new feature of the app may be immediately preceded by an embedded presentation of the message, which is cleared by the user after acknowledgement to reveal the new feature.

In some embodiments, the message and modality in which to present the message are selected is based on the enabled new feature. For example, a new feature in which the background is updated to reflect an event or time of year, the message is embedded within the background. In another example, for a new feature of a diet support app that calculates consumed calories and expended calories from activity steps taken, a message is embedded in a video that provides instruction for the new feature of the app.

In embodiments of the present invention, messages embedded within a new feature of an app include, but are not limited to: informative messages, opinion messages, educational messages, alert or warning messages, event promotional messages, advertisement-based messages, news or current event messages, and persuasion-based messages. In some embodiments of the present invention a message is selected from a plurality of available messages, based on the profile information of the user gathered from the mobile smart device on which the app resides and operates. In other embodiments, the message and modality are selected based on the nature of the update to the application.

Figure 1:
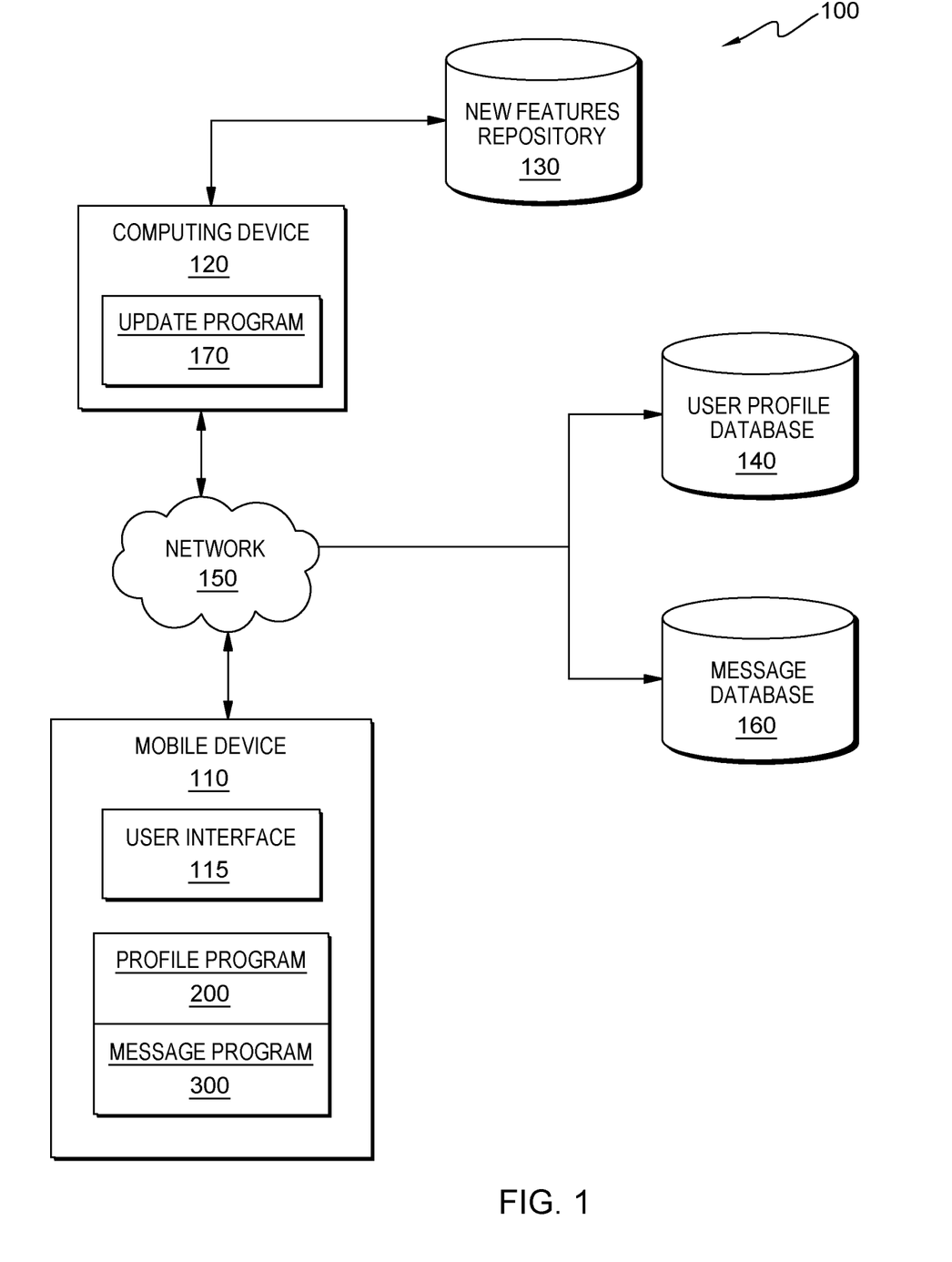
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 110, computing device 120, new features repository 130, user profile database 140 and message database 160, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between mobile device 110 and profile program 200 and message program 300 operating on mobile device 110; computing device 120, and update program 170 operating on computing device 120; new features repository 130, user profile database 140, and message database 160, in accordance with embodiments of the present invention.

Mobile device 110 is a smart computing device packaged in a mobile format and includes user interface 115, profile program 200, and message program 300. Mobile device 110 can be a portable computing device, a smart phone, a smart watch, a tablet computer, a netbook computer, a personal digital assistant (PDA), or any other programmable electronic mobile device of capable of receiving, sending, and processing data, and communicating with update program 170 operating on computing device 120, new features repository 130, user profile database 140, message database 160, and other computing devices (not shown) within distributed data processing environment 100 via network 150. In other embodiments, mobile device 110 can represent a virtual mobile computing device operating based on multiple computers as a server system, such as in a cloud computing environment. In another embodiment, mobile device 110 represents a computing system utilizing clustered computers and components (e.g., database server computers, application server computers, etc.) that act as a single pool of seamless resources when accessed within distributed data processing environment 100. Mobile device 110 may include internal and external hardware components, as depicted and described in FIG. 4.

User interface 115 provides users of mobile device 110 an interface to profile program 200 and message program 300. Additionally, user interface 115 provides a source for user operation and input to applications and functions operating on mobile device 110. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to mobile device 110. In some embodiments, input is automatically received from update program 170 operating on computing device 120, via a communications port of computing device 110.

Profile program 200 is an application module operating on a mobile device 110 and connected to network 150 of distributed data processing environment 100. Profile program 200 determines apps residing on and downloaded to mobile device 110 and checks whether the respective application is enabled with embedding messages in application updates. For the case in which profile program 200 determines the application is enabled with message embedding within an application update, profile program 200 confirms whether permissions of access to mobile device 110's resources have been granted by the user, and if so, profile program 200 collects permissioned user mobile device usage, behavior, and activity data. Profile program 200 analyzes the collected data over time and generates a user profile of preferences and behaviors based on the collected data.

In some embodiments, profile program 200 determines a preference or identifies common behaviors and activities based on frequency of the behavior or activity and the associated conditions and subject matter. Conditions may include, but are not limited to patterns of location, time of year, day of the week, time of day, recorded events on calendar app, searches, browsing, purchases, and communicated topics associated with activity and events. Profile program 200 operates based on user approval of data collection and generates a user profile that includes topic categories associated with the actions, activities and behaviors of the user of mobile device 110, based on the approved data collected. The generated user profile is used to select messages to embed in new or improved feature updates of an app operating on mobile device 110.

Message program 300 is an application operating on a mobile computing device, such as mobile device 110, which is connected to network 150 of distributed data processing environment 100. Message program 300 receives a notification indicating an update is available for an application operating on mobile device 110. In some embodiments of the present invention, the notification is presented to the user of mobile device 110 for an acceptance or rejection response. In other embodiments, a setting option selection for mobile device 110 automatically accepts and installs application updates. In yet other embodiments, settings for mobile device 110 include designating automatic update acceptance by respective application.

Message program 300 determines a message to embed within the update of the application that is directed to the user of mobile device 110. In some embodiments, the message is determined based on the user profile generated by profile program 200, and may include, but is not limited to an informative message, an opinion message, an educational message, an alert or warning message, an event promotional message, an advertisement-based message, a news or current event message, and a persuasion-based message. In other embodiments, the message and modality of delivering the message are determined based on consideration of the type of feature included in the update to the application. Using profile information generated for the user of mobile device 110 by profile program 200, and information regarding a new or improved feature of the update to the application, message program 300 accesses message database 160 and determines a selection of message and a type of modality from a plurality of messages and modality formats within message database 160.

Message program 300 determines a modality to use for embedding the message within the update of the application. In some embodiments, the modality of embedding the message includes use of one or combinations of displayed text, images, video, audio, and symbols, to embed the message. In some embodiments, message program 300 directly includes the message within a background or backdrop of a screen display that includes a new or updated feature of the application, such as including a text message within the background of a feature instruction/setting page.

In some embodiments, the modality of the message corresponds to the type of feature or change included in the application update. For example, an update of an application that improves presentation and manipulation of images may include the message as an initial image displayed and may include text within the image. Similarly, a new feature that provides improved audio controls of an application may include the message as an initial audio file to be played as part of the initial use of the updated feature. Message program 300 embeds the selected message in the updated feature of the application applying the chosen modality in which to deliver and present the message. In some embodiments, message program 300 activates the update feature of the application and presents the message in response to the initiation of the update feature by the user of mobile device 110.

Computing device 120 is connected to network 150 and new features repository and includes update program 170. Computing device 120 can be a standalone computing device, a management server, a web server, a mobile computing device, or any other electronic device or computing system capable of receiving, sending, and processing data. In other embodiments, computing device 120 can represent a server computing system utilizing multiple computers as a server system, such as in a cloud computing environment. In another embodiment, computing device 120 can be a laptop computer, a tablet computer, a netbook computer, a personal computer (PC), a desktop computer, a personal digital assistant (PDA), a smart phone, or any other programmable electronic device capable of communicating with new features repository 130, and message program 300 operating on mobile device 110, and other computing devices (not shown) within distributed data processing environment 100 via network 150. In another embodiment, computing device 120 represents a computing system utilizing clustered computers and components (e.g., database server computers, application server computers, etc.) that act as a single pool of seamless resources when accessed within distributed data processing environment 100. Computing device 120 may include internal and external hardware components, as depicted and described in FIG. 4.

Update program 170 is part of a development environment in which new features and improved feature updates are developed for designated applications. Update program 170 sends a finalized version of an update for an application to new features repository 130. In some embodiments of the present invention, update program 170 generates and sends notifications of an available update for an application downloaded to or operating on mobile device 110. In response to receiving acceptance of the application update from a receiving device, such as mobile device 110, update program 170 accesses the update code from new features repository 130 and transmits the application update code to the receiving device. If update program 170 does not receive a confirmation accepting the application update, then update program 170 takes no action.

New features repository 130 is a storage structure for application updates of new and improved features. Application updates are developed and sent to new features repository by update program 170. Application updates are stored by identifying version labels or code additions associated with the application and are accessed by update program 170 for transmission to devices confirming acceptance of application updates. In some embodiments, the initial download of an application may include one or more update features that are presented as feature notifications to a user of the receiving device and include an embedded message that is presented in response to initiation of the application feature. In some embodiments of the present invention, new features or improved features may be included in the download of an application to a mobile device, such as mobile device 110, but remain deactivated until a triggering event is detected by the application. In some embodiments, the triggering event may be a function of time or usage of the application. In other embodiments, the triggering event may be a command or signal received by the application that activates the feature.

For example, an application includes a new feature that updates the background of the application to correspond with the scheduled beginning of the Olympics. Update program 170 transmits an activation code to the application on the scheduled start date of the Olympics, and the background feature update of the application is activated to display the Olympic rings and the date range corresponding to the Olympic games. The message is embedded within the updated background of the application that includes the Olympic symbols and dates.

User profile database 140 is a repository for the analyzed and summarized data collected from the user activity and behavior associated with mobile device 110. User profile database 140 includes the current summary of the user profile associated with a particular smart device, such as mobile device 110. Message program 300 determines a message to embed in an application update for an application operated by the user of mobile device 110, by accessing the user profile associated with mobile device 110 in user profile database 140 and applying the preferences, activities, purchases, and other user behavior associated with mobile device 110 to select a message for embedding in an application update designated for mobile device 110. Embodiments of the present invention include the user participating in actively reviewing and granting permission for the collection of mobile device user information and provide options for the user to view or delete collected information, and to terminate collection of mobile device user information.

Message database 160 is a repository of messages for embedding within an update of features for an application. Message database 160 is accessed by message program 300 and a message is selected for a user of a device operating the application to which a feature update has been accepted. In some embodiments, the message selection by message program 300 is based on the user profile generated by profile program 200, operating on mobile device 110. In other embodiments, the message selection and modality of delivery of the message is based on consideration of the type of feature included in the update to the application. Message database 160 is populated with messages from one or more sources. For example, in some embodiments, message database 160 receives informational messages intended to provide awareness to users of information not well known or distributed. In some embodiments, message database 160 receives educational information directed to a particular topic, such as nutrition, health, or self-improvement. In other embodiments, message database 160 receives messages that provide advertisement for products or services corresponding to aspects of a mobile device user's profile. In yet other embodiments, message database 160 receives messages professing an opinion on a topic, support for election candidates or proposals for voting, or social connection invitations.

Figure 2:
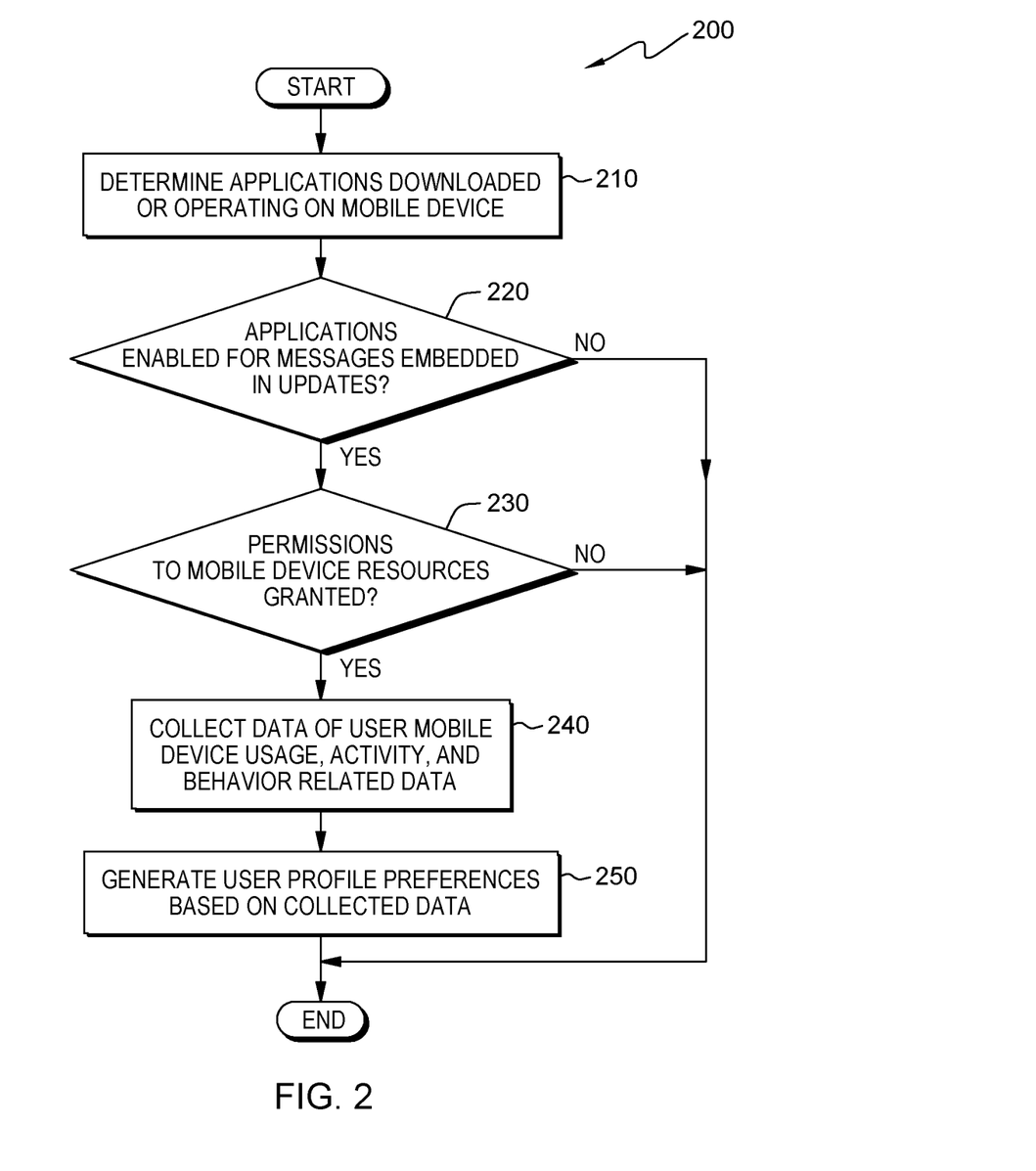
FIG. 2 illustrates operational steps of a profile program, inserted on a computing device within the distributed data processing environment of FIG. 1, in accordance with an embodiment of the present invention.

FIG. 2 illustrates operational steps of profile program 200, operating on mobile device 110 within distributed data processing environment 100 of FIG. 1, in accordance with an embodiment of the present invention.

Profile program 200 determines applications operating on the mobile device (step 210). Profile program 200 resides and operates on a mobile device and determines and identifies applications also operating on the mobile device. For example, profile program 200, residing and operating on mobile device 110, accesses and identifies the applications installed on mobile device 110.

Profile program 200 determines whether applications are enabled for messages embedded in application updates (decision step 220). In some embodiments of the present invention, profile program 200 determines whether a particular application operating on the mobile device is enabled to receive and embed messages within updates of the application. In some embodiments the application may include a setting or field indicating enablement for embedded messages within an update of the application. In other embodiments, profile program 200 considers all applications enabled to receive and embed a message within an application update and proceeds to step 230 to check for permissions granted. For the case in which profile program 200 determines that an application is not enabled to embed messages within an update of the application (step 220, "NO" branch), profile program 200 ends. For the case in which profile program 200 determines that an application is enabled to embed messages within an update of the application (step 220, "YES" branch), profile program 200 proceeds to determine whether permissions to access mobile device resources have been granted (decision step 230).

For example, profile program 200 determines that one or more applications on mobile device 110 are enabled to receive and embed messages within an update of the respective application and proceeds to step 230 to check whether permissions are granted.

For the case in which profile program 200 determines that permissions to access mobile device resources have not been granted, profile program 200 ends. In some embodiments of the present invention, profile program 200 determines whether granted permissions include the collection of combinations of: application and function activity, behavior associated with location, travel, calendar and scheduling information; online search, browsing, social media communication; and purchasing activity. For the case in which profile program determines that permissions to access the mobile device resources have been granted, profile program 200 proceeds to step 240.

Profile program 200 collects data of user mobile device usage, activity, and behavior related data (step 240). In some embodiments of the present invention, having received permissions to access resources of the user's mobile device, profile program 200 collects the user's data associated with the mobile device and analyzes the collected data determining topics, locations, activities, social associations, preferences of purchased items as well as other behavior and activity, and associates the data with frequency of occurrence, scheduling (season, day of week, time of day, etc.), and subject matter. Profile program 200 analyzes the data, developing a summarization of the data, including topics and areas of interest as well as preferences of the user of mobile device 110. For example, the data collected for the user of mobile device 110 includes calendar entries for appointments and activities before 9 a.m. and after 5 p.m., travel and location data indicating a work location, frequent social messaging with a few individuals, and repeated activity on Friday evening at a club, and Sunday morning at a golf course.

Profile program 200 generates a user profile including preferences based on the collected mobile device data (step 250). The analyzed and summarized data collected from the mobile device activity, location, and user behavior data is used to generate a user profile. In some embodiments the user profile is stored in user profile database 140 and is accessed by message program 300 for determining a selection of messages to embed within an update of an application operating on mobile device 110.

Figure 3:
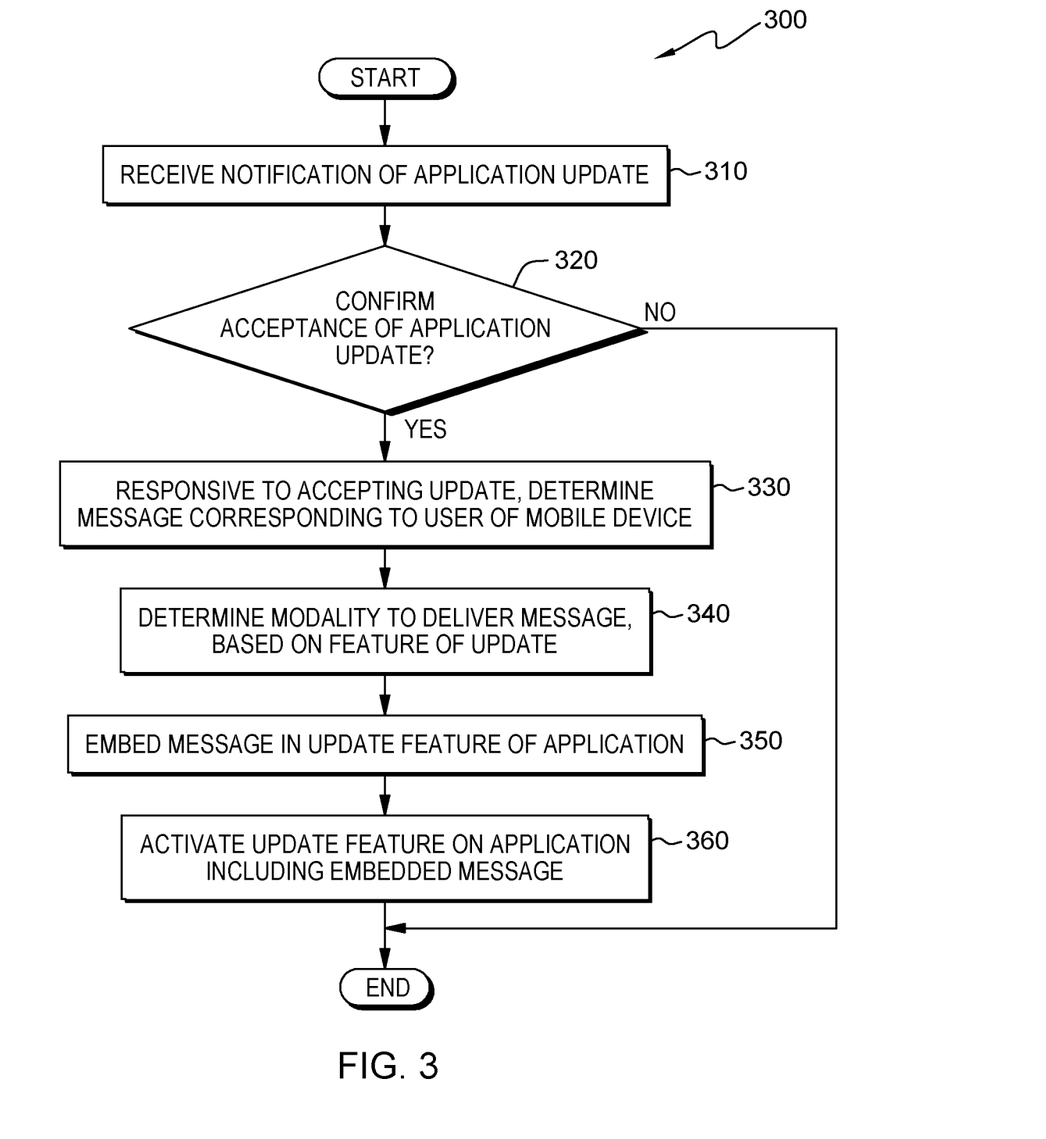
FIG. 3 illustrates operational steps of a message program, inserted on a computing device within the distributed data processing environment of FIG. 1, in accordance with an embodiment of the present invention.

FIG. 3 illustrates operational steps of message program 300, operating on computing device 110 within distributed data processing environment 100 of FIG. 1, in accordance with an embodiment of the present invention.

Message program 300 receives a notification of an application update (step 310). An update to an application operating on mobile smart device, such as a smart phone or tablet is available and made known by a push notification from the application development source, for example, sent to installed instances of the application on mobile devices. In some embodiments of the present invention, the notification is displayed on a user interface of the mobile device and includes a response option to accept, decline, or delay installing the application update. In some embodiments, the mobile device includes settings to allow automatic installation of application updates. In some embodiments, an identity of a mobile device is determined when an app is selected and downloaded. The identity of the mobile device is transmitted and applied to distributing notifications of an available update to the application.

Message program 300 determines whether acceptance of the application update has been confirmed (decision step 320). For the case in which the application update notification has been received by the mobile device but has not been accepted (step 320 "NO" branch), message program 300 ends until such time that an acceptance response to the update notification is received. For the case in which the acceptance of the application update has been confirmed (step 320 "YES" branch), message program 300 determines a message to embed in the application update, corresponding to the user (step 330).

Message program 300 selects a message from message database 160 to include with the update of the application, by embedding the message within the update. In some embodiments of the present invention, message program 300 selects the message to correspond to the user of mobile device 110 based on the user profile generated by profile program 200. In some embodiments multiple messages may be available to a particular user, and message program 300 selects a message corresponding to the analyzed and summarized data of the user of mobile device 110 that includes, for example, location, travel, interests, activity, purchases, and social media participation data of the user.

In some embodiments, message program 300 may prioritize messages based on sponsorship of the message. For example, a product retailer may pay a fee to a developer of an application to prioritize an advertising message to be embedded in an update of an application created by the developer. In another example, an organization interested in preserving natural habitat land pays a promotional fee to have their message embedded in a hiking trail app update. In another example, a message is selected based on the location and weekend activity of the user of mobile device 110, such as the user of mobile device 110, having downloaded and used an application for booking hotel reservations, receives an embedded message in an update to the application. The message corresponds to weekend trips to the beach by the user and includes an offer of an extended stay discount. In yet other embodiments, the message is selected based on the feature type or nature of the update to the application.

Message program 300 determines a modality to deliver the message, based on the feature associated with the application update (step 340). The modality is the mode or media format in which the message, embedded in the update, is delivered. In some embodiments, if the application update includes background or display format changes, the message is included in one or more components of the background or display and includes a text-based message or graphic message, for example. In other embodiments, if the update includes one or more images, the message may be embedded in an image that is presented along with the update images. In yet other embodiments, streaming or video components of an update include the message within a video or an introduction or trailer of the update video. For example, a news highlight application has an update to modify the background of the application home page with the Olympic rings symbol, scheduled to display one day before the opening ceremonies of the Olympics. The background change with embedded text is chosen as the modality delivering the embedded message.

Message program 300 embeds the message within the feature update of the application (step 350). In embodiments in which a new or improved function or feature is introduced in the app update, the message is included within a portion or component of the updated function or feature. In some embodiments, the message may be presented briefly and removed, whereas in other embodiments, the message may require a user to acknowledge the message by an action, to remove the message and proceed with access and use of the new function or feature. For example, continuing with the previously mentioned Olympic symbol example, a message displaying text and a logo for the news media providing Olympic coverage, displays a highlight of events for each of the first five days by presenting the message information for a given day embedded in or around a corresponding Olympic ring. The embedded message is presented for a predetermined duration and fades from the background of the application new feature update. After the conclusion of the Olympic coverage by the news media, the message is deactivated.

Message program 300 activates the update feature of the application including presenting the embedded message (step 360). Having embedded the selected message within an update feature of the application, message program 300 activates the update feature triggering the presentation of the message embedded within the update feature. Message program 300 enables the new feature, and accordingly, the embedded message is presented to the user. In some embodiments of the present invention, the message is presented for a brief duration and is removed, leaving the activated update feature available to the user. In some embodiments, the user dismisses the message manually, whereas in other embodiments, the embedded message expires and is removed from view after a brief duration of display.

In some embodiments of the present invention, an embedded message may be one or a combination of: a symbol, a logo, an audio message, a video message, an image, a text-based message, and a graphical message.

A non-limiting set of additional examples of message program 300 embedding messages in an update of an application, is provided.

An example of a message embedded in an update of an application is a case in which a user downloads a gaming app that includes a "play now, pay next month" feature. The feature helps the user obtain the gaming app with a delayed payment system, which is a key selling point. The feature enables a user to pay by a credit card one month after playing the game, which allows another month before the user settles the bill without accruing interest on the purchase. This provides the user with two months of play time with interest free credit. Message program 300 selects an ad as a message for additional games that include this purchase/payment feature, and embeds the ad within a short video as part of the feature introductory video within the app.

Another example is a case in which a hotel application includes an update that adds a feature for "planning your meals" that lets the user plan their meals during their holiday stay in a hotel. A message embedded in the feature main display includes an advertisement for a particular restaurant offering a diverse selection of meal types. The ad will instantiate when the new feature is accessed, and the ad will have a short lifespan; removed once it has been shown a threshold number of times or during feature access for a threshold duration period. In some embodiments, the ad could change and be re-instantiated as a function of the user profile and update context.

In another example the user permissioned data indicates travel during weekdays to a work destination, and afterward to a social club within 15 minutes from the user's residence. Location data also indicates visits to a gym approximately 1 mile from work, prior to work. Weekend location data indicates travel to parks, lakes, and theaters. The user's calendar function shows a trip planned next month to a health spa, and social media communications indicates the user has friends planning to also attend the spa. The user's mobile device includes a health assessment application, and a new feature for the app includes a body fitness computation function. Activating the new feature presents an embedded message of an advertisement (or recommendation) of health-based activities located near the planned spa visit.

Figure 4:
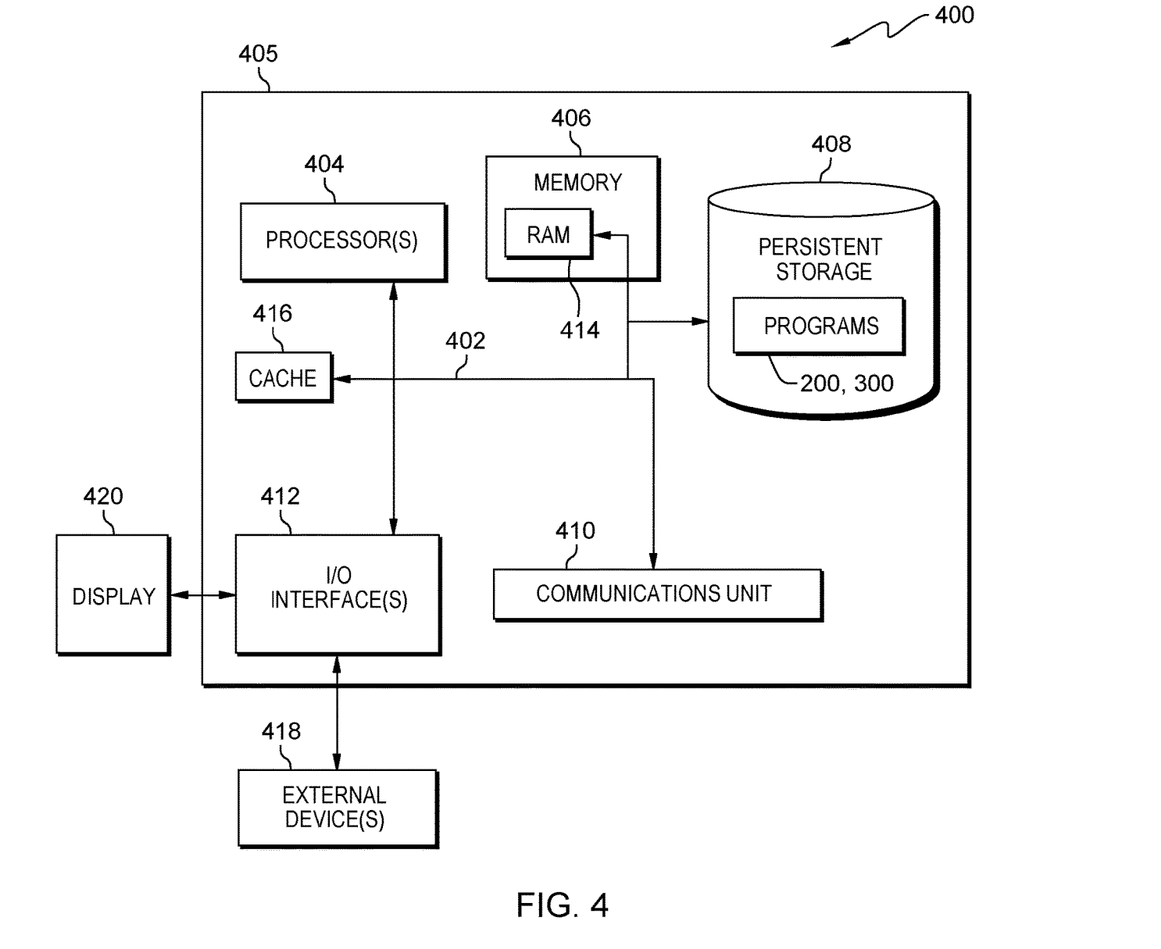
FIG. 4 depicts a block diagram of components of a computing system, including a computing device capable of operationally performing the profile and message programs of FIGS. 2 and 3 respectively, in accordance with an embodiment of the present invention.

FIG. 4 depicts a block diagram of components of computing system 400, which includes computing device 405. Computing device 405 includes components and functional capability similar to computing device 110 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Profile program 200 and message program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Profile program 200 and message program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., registration program 200 and authorization program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dynamically embedding a message within an update to a mobile application, the method comprising:
    one or more processors collecting user preference information, activity information of application usage performed by a user, and behaviors associated with usage of a mobile device operated by the user;
    responsive to detecting a feature update to a first application operating on the mobile device is available, the one or more processors determining whether installation of the feature update to the first application is accepted by the user;
    responsive to determining the installation of the feature update to the first application is accepted by receiving an acceptance response from the mobile device, the one or more processors selecting a message directed to the user of the mobile device from one or more available messages, based on the preference information, a frequency of the activity information, and the behaviors associated with the usage of the mobile device operated by the user;
    the one or more processors embedding the message within the feature update to the first application and sending the feature update to the first application on the mobile device, wherein embedding the message includes the message within a component of the feature update; and
    responsive to the user of the mobile device accessing the feature update to the first application installed on the mobile device, the one or more processors presenting the message embedded within the component of the feature update to the user.

2. The method of claim 1, further comprising:
    the one or more processors determining a modality in which the message embedded within the update to the first application is delivered; and
    the one or more processors delivering the message embedded in the update to the first application by the determined modality.

3. The method of claim 2, wherein selection of the modality in which the message is delivered within the update to the first application includes consideration of a type of feature available in the update of the first application.

4. The method of claim 1, further comprising:
    the one or more processors presenting the message to the user operating the mobile device during a performance of the update to the first application.

5. The method of claim 1, wherein the user preference information, activity information of application usage performed by a user, and behaviors associated with the usage of the mobile device operated by the user includes one or more selections from a group consisting of: location data, travel patterns, purchase patterns, and scheduled activity data.

6. The method of claim 1, wherein selection of the message includes considering of a type of feature available in the update to the first application and embedding the message within a feature included in the update to the first application.

7. The method of claim 1, wherein the application includes permissions accepted by a user of the mobile device, and wherein the permissions include preferences, location data, search data, online activity, and calendar data used to establish a profile of the user of the mobile device.

8. The method of claim 1, wherein the update to the first application includes a new feature of the first application operating on the mobile device operated by the user.

9. The method of claim 1, wherein the message embedded within the update to the first application is selected from a plurality of available messages, based on profile information from collection of the preference information, the activity information, and the behaviors associated with the usage of the mobile device.

10. The method of claim 1, further comprising:
    the one or more processors summarizing the user preference information, the activity information of the application usage performed by the user, and the behaviors associated with the usage of the mobile device operated by the user as collected data; and the one or more processors providing the user access to view the collected data and allow the user to delete the collected data.

\* \* \* \* \*